United States Patent
Kamatani

[11] Patent Number: 5,966,364
[45] Date of Patent: Oct. 12, 1999

[54] OPTICAL PICK-UP APPARATUS FOR MULTIPLE DATA SURFACE OPTICAL DISK SYSTEM

[75] Inventor: Yasuo Kamatani, Sagamihara, Japan

[73] Assignee: Laser Dynamcics, Inc., Kanagawa-ken, Japan

[21] Appl. No.: 08/958,875

[22] Filed: Oct. 27, 1997

Related U.S. Application Data

[63] Continuation of application No. 08/702,908, Aug. 26, 1996, abandoned.

[51] Int. Cl.$^6$ ........................................................ G11B 7/00
[52] U.S. Cl. ............................................. 369/112; 369/94
[58] Field of Search .................................... 369/109, 102, 369/112, 94, 44.12, 54, 58, 103, 116, 121, 93

[56] References Cited

U.S. PATENT DOCUMENTS 5,526,338  6/1996  Hasman et al. .................... 369/94 X

*Primary Examiner*—Paul W. Huber
*Attorney, Agent, or Firm*—Rabin & Champagne, P.C.

[57] ABSTRACT

An optical pick-up device includes a laser source which emits multi-mode laser beam consist of varied wavelength in wide spectrum, and an optical filter which eliminates improper ranges of the laser's spectrum and transmits only preferred wavelength domains. Therefore, a diffraction device composed of at least two diffractive elements can produce several focal points dependent upon selected wavelength by the optical filter and diffractive index of the each diffractive element.

7 Claims, 6 Drawing Sheets

OPTICAL PICK-UP APPARATUS FOR MULTIPLE DATA SURFACE OPTICAL DISK SYSTEM

This application is a continuation of application Ser. No. 08/702,908, filed Aug. 26, 1996 (now abandoned).

BACKGROUND OF THE INVENTION

1. Field of the Invention

This invention relates to optical data storage systems. More specifically, this invention relates to an optical reading and recording apparatus and method for optical data storage systems having multiple data storage surfaces.

2. Description of the Prior Art

Initialized by the vast increase in information that needs to be processed, optical data storage system have become most important system particularly because of their high storage density per area. Most of the recent optical information storage systems rotating single optical disk are used on which the information is digitally stored in concentric circular tracks in an ordered, predifined manner to allow chronological fast reading and fast random access to desired pits of data.

In order to accomplish the even more storage capacity of optical disk systems for the enormous information processing, such as video or picture communication like so called video-on-demand service, multiple disk systems have been proposed. An optical disk system having two or more data layers may in theory be accessed at different disks by changing the focal point with moving lens. Example of this type of state-of-the-art include U.S. Pat. No. 5,202,875 issued Apr. 13, 1993 to Rosen, et al.; Japanese Published Application, 63-276732 published Nov. 15, 1988 by Watanabe, et al.

The serious problem with these prior art systems is an interference lights reflected on neighboring layers, that causes difficulty to detect the data recorded on certain layer. That cross-talk-signals from the other layers may effect critically to reduce the ability to read the data, especially with several data layers system. In addition, all of the prior art systems requires the moving lens component to modulate the focal point of the laser beam. Example of such type of state-of-the-art include U.S. Pat. No. 5,416,756 issued May 16, 1995 to Takeshita, et al. However, such a actuating component including moving lens can not be fabricated on a single substrate. That has been considered disadvantage on productivity and reliability. An optical reading, and recording pick-up device is needed which overcomes these problems mentioned above.

SUMMARY OF THE INVENTION

The present invention has for its object to provide an optical reading and recording pick-up device for multiple data layers system, in which moving mirror is no longer necessary to focus onto selective layer. Another significant object of the invention is to provide a reliable optical pick-up device for multiple data layers system, which can greatly reduce the effect of interference lights reflected on neighboring layers.

The object of the present invention can be achieved by an optical pick-up device for multiple data surface optical disk system, the apparatus comprising: a laser source which emits in-coherent laser beam; an optical filter which eliminates improper ranges of the laser beam's spectrum and transmits at least two part of selected spectrum; and a diffraction device composed of at least two diffraction element which produces diffracted beam each.

As for an exemplified structure, the laser beam emitted from laser diode is transmitted to the optical filter. Then the spectrum of the laser beam is selectively eliminated by the optical filter. For example, predetermined domains of $\lambda 1$ and $\lambda 2$ are transmitted and the other part of the spectrum is eliminated. The each of the spectrum $\lambda 1$ and $\lambda 2$ is transmitted to an aspheric lens which is comprising two part of duplexed lens element. The center part and outer part of the lens has different diffraction index. And the each of the spectrum $\lambda 1$ and $\lambda 2$ is diffracted by the center part and outer part of the aspheric lens to produce four focal points.

For a fuller understanding of the nature and advantages of the present invention reference should be made to the following detailed description taken in conjunction with the accompanying drawings.

DETAILED DESCRIPTION OF THE PREFERRED EMBODIMENT

Embodiments of the present invention will be explained with reference to the drawings.

Figure 1:
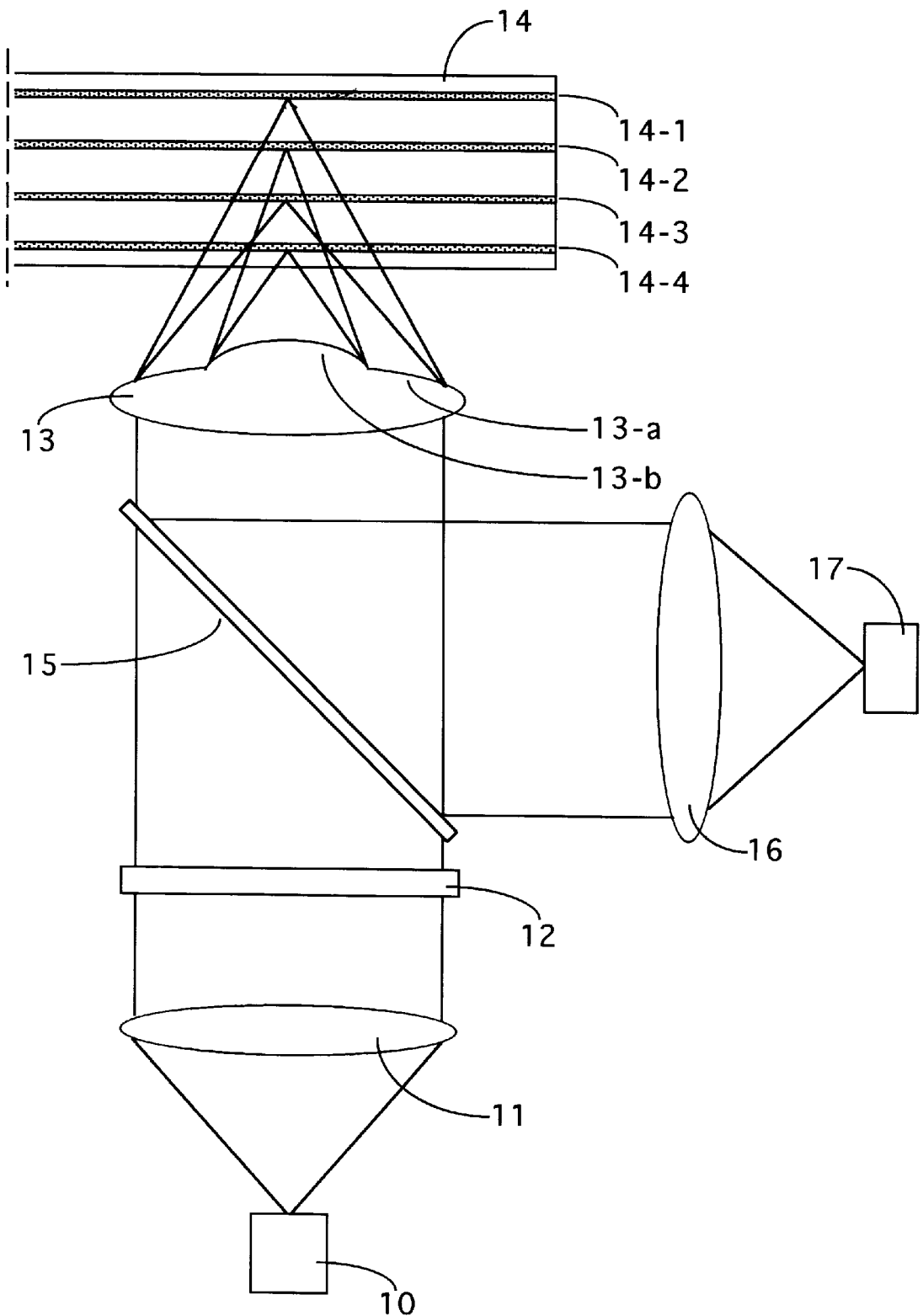
FIG. 1 shows schematic diagram of a first exemplified optical pick-up apparatus of the present invention.

FIG. 1 shows a schematic diagram of a first preferred embodiment of the optical pick-up apparatus of the present invention. A laser source 10 emits multi-mode laser beam which has wide spectrum. The emitted laser beam is collimated by a collimating lens 11. An optical filter 12 located on the laser beam path to intercept and selectively eliminate improper range of the laser's spectrum to cancel the interference noise. The functional detail of the optical filter 12 is fully explained lately with accompanying FIG. 2. In this exemplified embodiment, only the predetermined two domains of the laser spectrum of the wavelength is transmitted to an aspheric lens 13, and the laser beam is focused according to the laser spectrum's wavelength and diffractive index of the aspheric lens 13. The aspheric lens 13 consists of two part of lens element 13-*a* and 13-*b*. Each part of the lens element 13-*a* and 13-*b* has different diffractive index, then each of the laser spectrum produces two focal points. Thereafter, four focal points are produced with the optical filter 12 which transmits two part of the spectrum and the aspheric lens which has two part of lens element 13-*a* and 13-*b* as described in this exemplified embodiment. A multiple data surface optical disk 14 having four data surfaces 14-1~4 is associating with the optical pick-up apparatus of this exemplified embodiment. Each wavelength spectrum of the laser beam deflected by each part of the aspheric lens 13 is focused onto each data surface 14-1~4. Then each reflected laser beam from the data surface is deflected by a half-mirror 15. And the deflected laser beam is focused by a lens 16 to transmit the laser beam to a detector 17. Then, the optical signal detected by the detector 17 can be processed by conventional electrical circuits.

Figure 2:
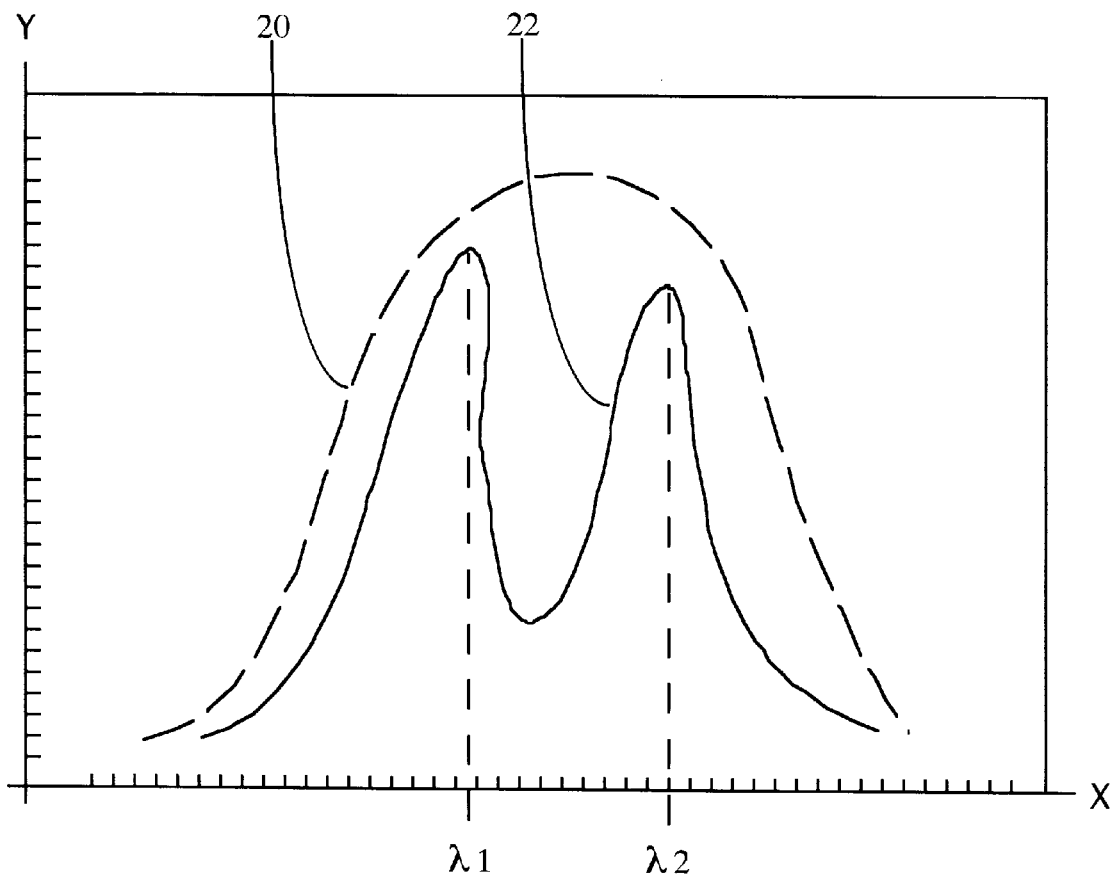
FIG. 2 is a graph of laser intensity versus wavelength of a laser source which is applied for the present invention.

FIG. 2 shows a graph of laser intensity versus wavelength of a laser source of the present invention. X axis of the graph denotes wavelength of the laser beam, and Y axis of the graph denotes intensity of the laser. A dotted line 20 shows laser emitting affairs of the multi-mode laser source. As mentioned, the multi-mode laser beam emitted from the laser source has wide spectrum, and it is functionally considered that the laser source emitting varied wavelength of the laser beam. A solid line 22 shows laser beam affairs that some parts of the pre-determined wavelength of the laser beam is eliminated and selectively secured by an optical filter. A graph 22 shows an example of the particular laser beam affair which preferred two parts of the laser beam spectrum $\lambda 1$ and $\lambda 2$ are secured, in order to focus onto four data layers associating with diffraction device consisted of two part of diffractive elements.

The apparatus of the present invention comprising an in-coherent laser source, gratings and an optical filter to vary the focusing positions, should be compared with the conventional apparatus that scans the laser beam by using a laser source which is tunable to produce different wavelength and a grating, for example U.S. Pat. No. 4,918,679 issued Apr. 17, 1990 to Ophenji, et al. However, in the prior art system, the wavelength is tuned by changing the current supply to the laser source. That must require complicated electrical circuit. In addition, it is quite difficult to tune the wavelength stably with outer electrical circuit.

The multi-mode laser source in the apparatus of the present invention does not require any complicated electrical circuits to drive. The multi-mode laser source to emit in-coherent laser beam, Super Luminescent Diode (SLD) for example, constantly emits varied wavelength of the spectrum beam. It is much more reliable to select the preferred wavelength spectrum by an optical filter, than tuning the wavelength itself by changing the current supply from the electrical circuit. In addition, in-coherent laser beam may hardly interfere one and another, that'll greatly reduce the effect of interference lights reflected on neighboring layers.

Figure 3:
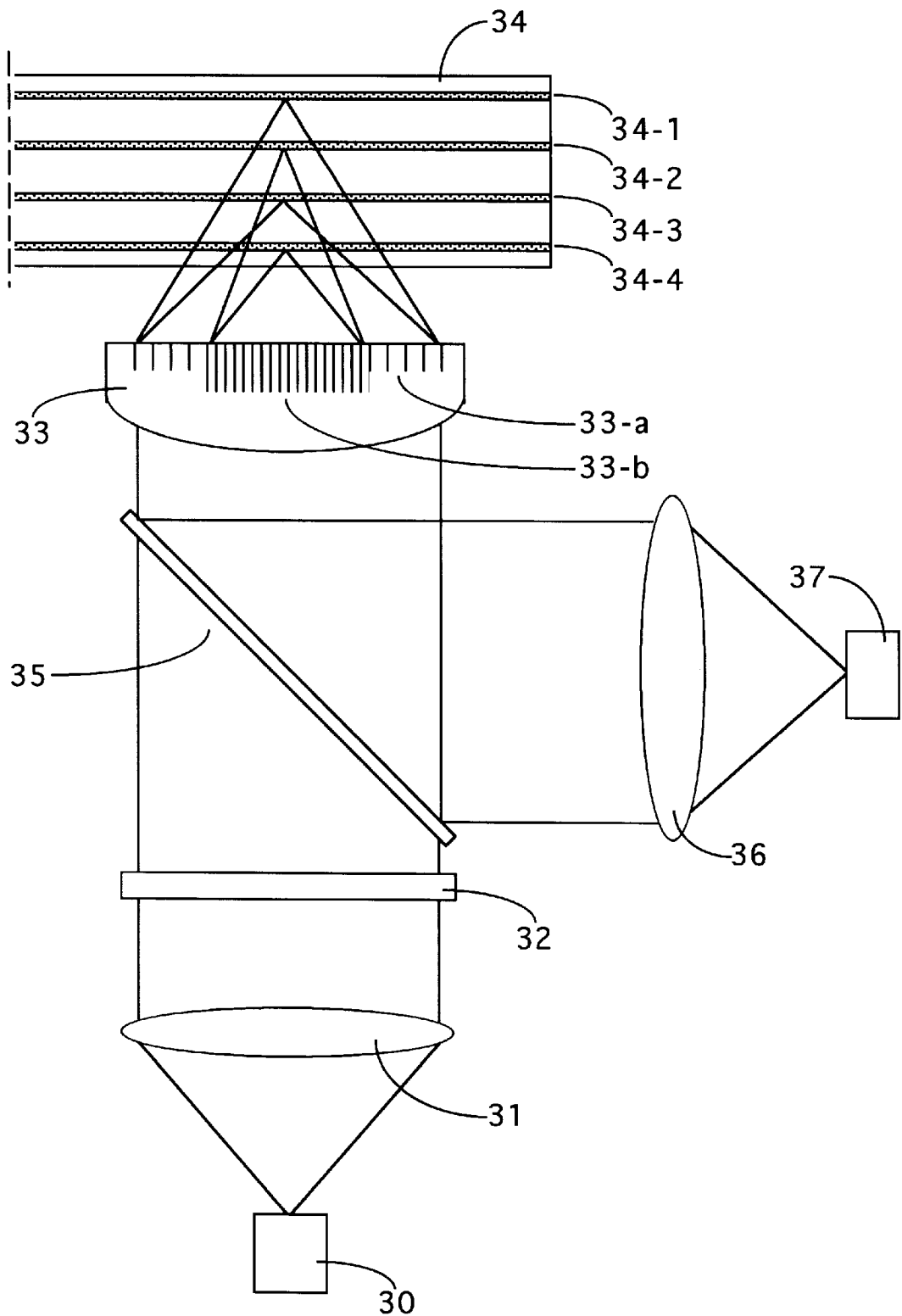
FIG. 3 shows schematic diagram of a second exemplified optical pick-up apparatus of the present invention.

FIG. 3 shows a schematic diagram of a second preferred embodiment of the optical pick-up apparatus of the present invention. A laser source 30 emits multi-mode laser beam which has wide spectrum. The emitted laser beam is collimated by a collimating lens 31. An optical filter 32 located on the laser beam path to intercept and selectively eliminate improper range of the laser's spectrum to cancel the interference noise. In this exemplified embodiment, only the pre-determined two domains of the laser spectrum of the wavelength is transmitted to a hologram lens 33, and the laser beam is focused according to the laser spectrum's wavelength and diffractive index of the hologram lens 33. The hologram lens 33 consists of two part of the engraved holographic grating 33-a and 33-b. Each part of the hologram 33-a and 33-b has different diffractive index, the hologram 33-a has low diffractive index with the wide grating pitch and the hologram 33-b has high diffractive index with the narrow grating pitch. Then each of the laser spectrum produces two focal points. Thereafter, four focal points are produced with the optical filter 32 which transmits two part of the spectrum and the hologram lens which has two part of holographic grating 33-a and 33-b as described in this exemplified embodiment. A multiple data surface optical disk 34 having four data surfaces 34-1~4 is associating with the optical pick-up apparatus of this exemplified embodiment. Each wavelength spectrum of the laser beam deflected by each part of the hologram lens 33 is focused onto each data surface 34-1~4. Then each reflected laser beam from the data surface is deflected by a half-mirror 35. And the deflected laser beam is focused by a lens 36 to transmit the laser beam to a detector 37. Then, the optical signal detected by the detector 37 can be processed by conventional electrical circuits.

Figure 4:
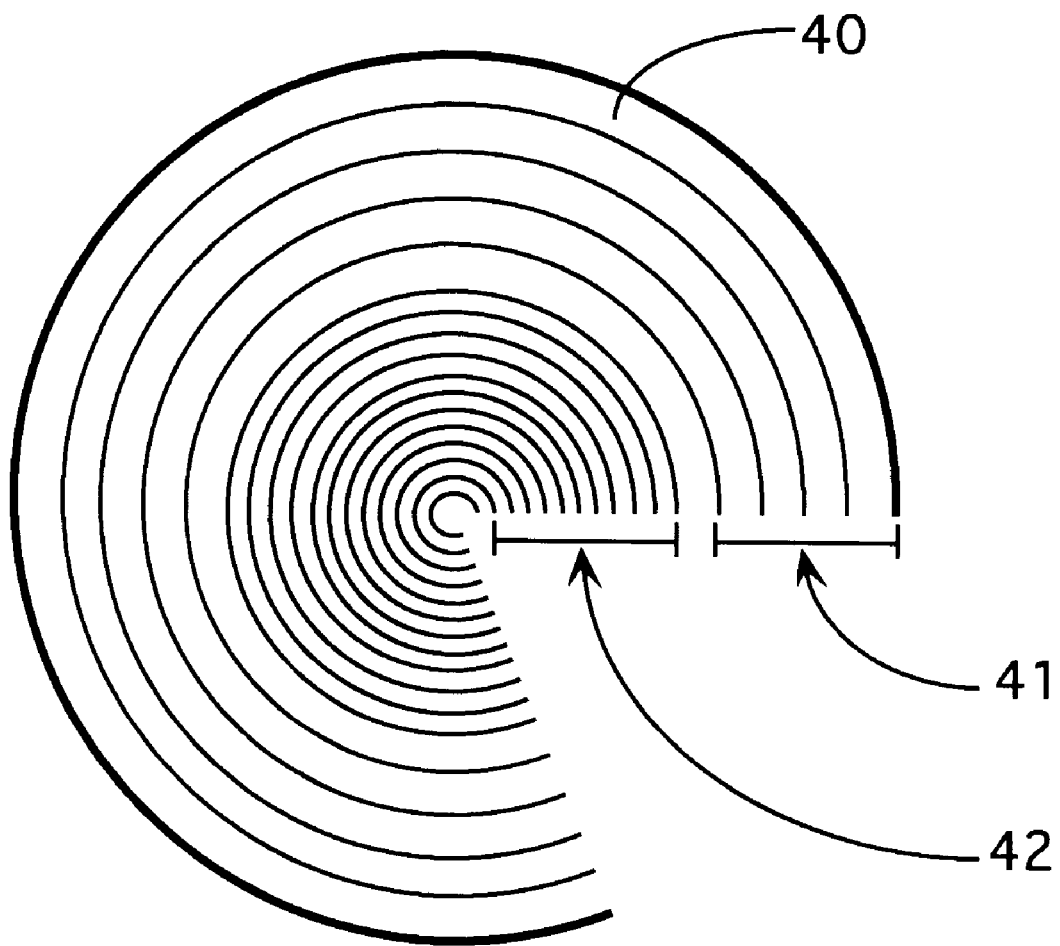
FIG. 4 is a schematic view of a hologram lens which is applied for the present invention.

FIG. 4 shows a schematic view of a hologram lens which is applied for the second preferred embodiment described in FIG. 3. A hologram lens 40 is composed of two part of holographic grating element. Part 41 has low diffractive index because of the grating element engraved with wide pitch. Part 42 has high diffractive index because of the grating element engraved with narrow pitch. The transmitted laser beam is partially focused by the grating element part 41 to produce far focal point. And the laser beam is also partially focused by the grating element part 42 to produce near focal point. The position of the focal point is varied with changing the diffractive index of the each grating element. The distance from the lens to the each focal point is also dependent upon wavelength of the laser beam. Then, single laser spectrum produces two focal points with dual hologram lens. Thereafter, four focal points can be produced with double laser spectrum transmitted from the optical filter.

Figure 5:
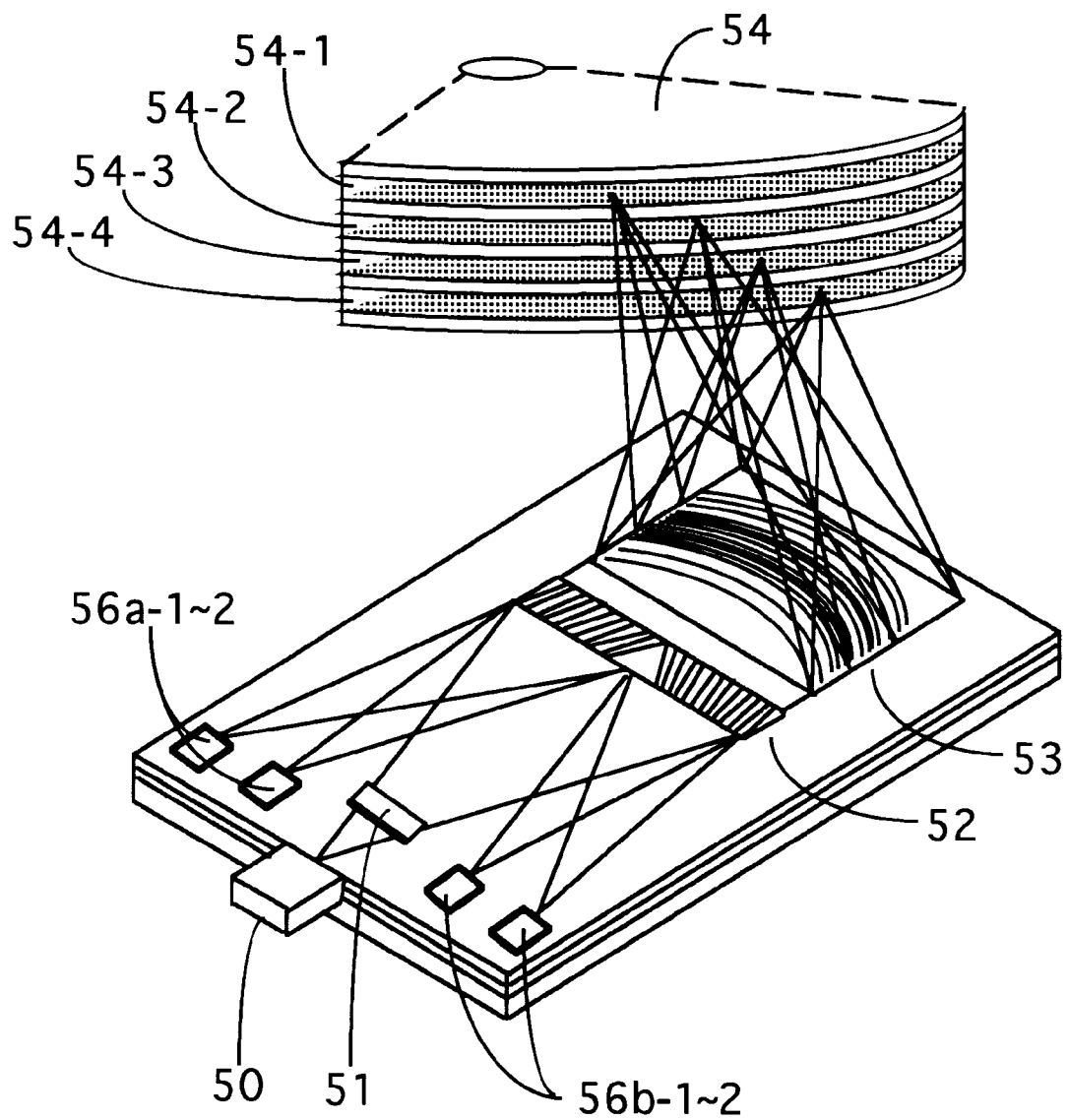
FIG. 5 shows schematic diagram of a third exemplified optical pick-up apparatus of the present invention.

FIG. 5 shows a schematic diagram of a third exemplified embodiment of an optical pick-up apparatus of the present invention. Especially, in this embodiment, all device composed of the present invention are fabricated on a single substrate as an optical integrated circuit. A laser diode 50 emits multi-mode laser beam which has wide spectrum. An optical filter 51 located on the laser path to intercept and selectively eliminate improper range of the laser's spectrum to cancel the interference noise. Only the selected domains of the laser spectrum is intercepted by a twin grating beam splitter 52, and the laser beam is collimated to enter a dual focusing grating coupler 53 efficiently. The dual focusing grating coupler 53 is consisted of two part of grating, center part grating has high diffractive index with narrow pitch grating and outer part grating has low diffractive index with wide pitch grating. The functional detail of the dual focusing grating coupler 53 is fully explained lately with accompanying FIG. 6. The laser beam is deflected and focused by a focusing grating coupler 53. The focal points are varied dependent upon the optical filter 51 which selectively transmits the certain wavelength spectrum and upon the dual focusing grating coupler 53 which focuses the laser spectrum with two part of focusing grating. A multiple data surface optical disk 54 having a data surface 54-1~4 is associating with the integrated optical pick-up device. Each wavelength spectrum of the laser beam focuses on each data surface 54-1~4. Then, each reflected laser beam is deflected by the dual focusing grating coupler 53. And the twin grating beam splitter 52 intercepts the laser beam, and deflects each wavelength spectrum of the laser beam for selective distribution into a detector 56a-1~2 and 56b-1~2. The optical signal detected by the detector 56 can be processed by conventional electrical circuits.

Figure 6:
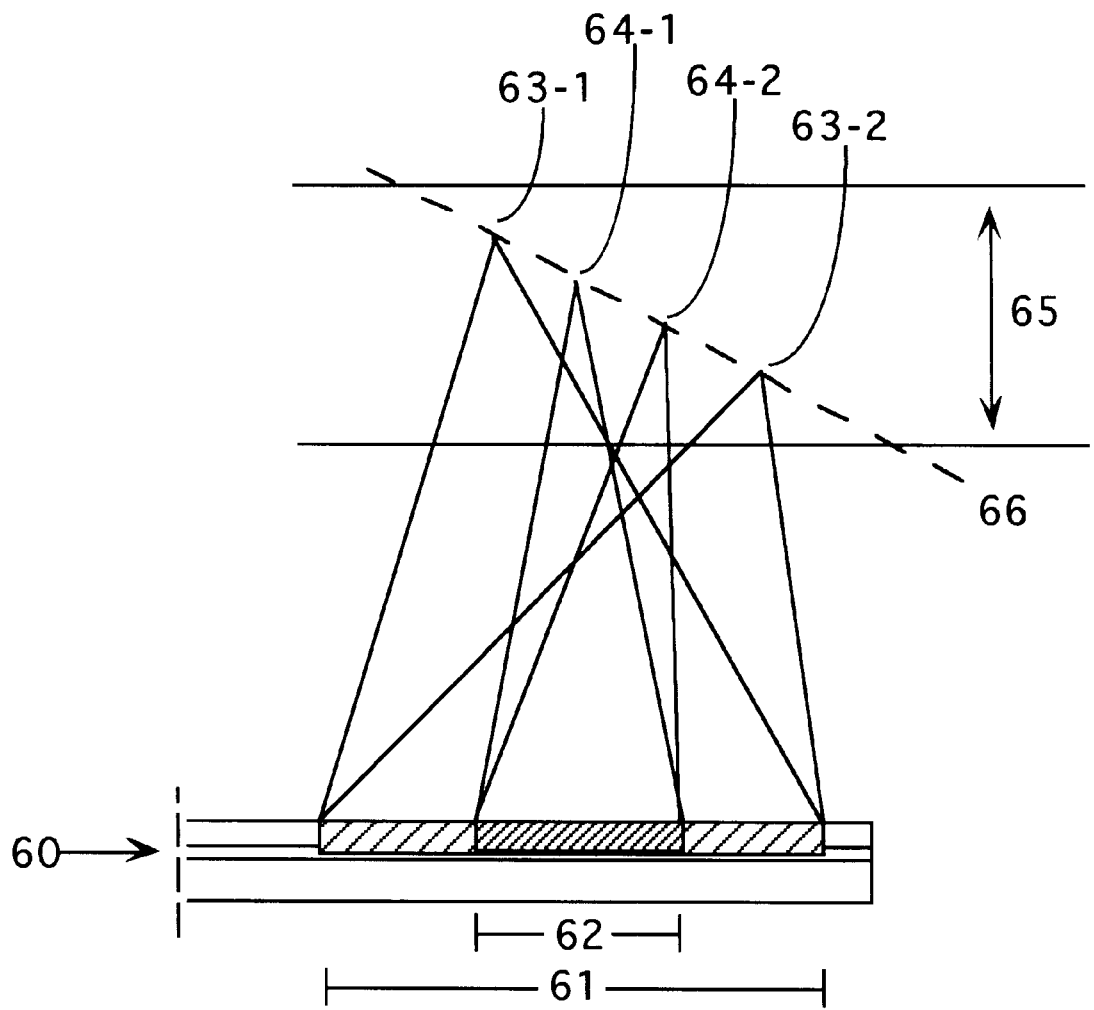
FIG. 6 is a cross-sectional view of an optical pick-up device of the present invention.

FIG. 6 shows a cross-sectional view of an optical pick-up apparatus of the present invention. This is enlarged view of the dual focusing grating coupler which is applied for the present invention. The laser beam 60 is the particular laser beam that preferred two parts of the laser beam spectrum as $\lambda 1$ and $\lambda 2$ in FIG. 2, are secured in order to focus on four data layers associating with the aspheric lens or dual hologram lens. A dual focusing grating coupler is consist of two part of grating coupler 61 and 62, the outer part 61 is an engraved grating which has low diffractive index with wide grating pitch and the center part 62 is an engraved grating which has high diffractive index with narrow grating pitch. The dual focusing grating coupler intercepts the laser beam 60. Then the laser beam 60 is deflected, and focused at four certain positions 63-1~2 and 64-1~2. Each of the four data layer must be located at positions between 65. By emitting varied wavelength of the laser spectrum, each laser beam's focal point locates on a dotted line 66 approximately. Each focal point can be controlled by changing the grating's pitch of the dual focusing grating coupler and by selecting the different part of the wavelength of the laser spectrum by the optical filter, by mounting a fixed lens or by changing the position of the integrated chip itself, etc.

Although the invention has been particularly shown and described, it is contemplated that various changes and modification may be made without departing from the scope of the invention as set forth in the following claims.

What is claimed is:

1. An optical apparatus, comprising:

a single laser which emits a multi-mode, wide-spectrum output;

an optical filter positioned to filter the multi-mode, wide-spectrum output so as to provide a laser beam output including light in a plurality of selected laser beam wavelength domains, the selected domains being wavelength non-contiguous with each other; and focusing means for focusing the light from the selected domains onto an optical medium at focal points having locations dependent on the wavelengths of the selected domains.

2. An optical apparatus according to claim 1, wherein the focusing means includes a plurality of focusing regions, the focusing regions having differing diffraction indices, each of said focusing regions receiving a portion of the light in each of the selected domains and focusing the received portion at a number of separate focal points, wherein said number of focal points is equal to the number of selected domains and the locations of the focal points are determined by the diffraction index of the focusing region and the wavelengths of the selected domains.

3. An optical apparatus according to claim 2, wherein the focusing means includes a grating, the grating including a first region with a first diffractive index and second region having a second diffractive index.

4. An optical apparatus according to claim 2, wherein the focusing means includes an aspheric lens, the lens including a first region with a first diffractive index and second region having a second diffractive index.

5. An optical apparatus according to claim 2, wherein the focusing means includes a holographic lens, the holographic lens including a first grating region with a first diffractive index and second grating region having a second diffractive index.

6. An optical apparatus, comprising:

a single laser which emits a multi-mode, wide-spectrum output;

an optical filter positioned to filter the multi-mode, wide-spectrum output so as to provide a laser beam output including light in a plurality of selected laser beam wavelength domains, the selected domains being wavelength non-contiguous with each other; and a plurality of focusing regions, the focusing regions having differing diffraction indices, each of said focusing regions receiving a portion of the light in each of the selected domains and focusing the received portion at a number of separate focal points, wherein said number of focal points is equal to the number of selected domains and the locations of said number of focal points are determined by the diffraction index of the focusing region and the wavelengths of the selected domains.

7. An optical apparatus, comprising:

a single laser which emits a multi-mode, wide-spectrum output;

an optical filter positioned to filter the multi-mode, wide-spectrum output so as to provide a laser beam output including light in a plurality of selected laser beam wavelength domains, the selected domains being wavelength non-contiguous with each other;

an optical medium having a plurality of separate layers; and a plurality of focusing regions, the focusing regions having differing diffraction indices, each of said focusing regions receiving a portion of the light in each of the selected domains and focusing the received portion at a number of separate focal points on different ones of said separate layers of said optical medium, wherein said number of separate focal points is equal to the number of selected domains and the locations of said focal points are determined by the diffraction index of the focusing region and the wavelengths of the selected domains.

* * * * *